United States Patent Office 2,942,038
Patented June 21, 1960

2,942,038

PRODUCTION OF CHLOROPRENE

Philip Aldwyn Jenkins, Ashstead, England, assignor to The Distillers Company Limited, Edinburgh, Scotland, a company of Great Britain No Drawing. Filed Nov. 18, 1958, Ser. No. 774,604

6 Claims. (Cl. 260—655)

The present invention relates to the production of chloroprene, and in particular to the production of chloroprene by the dehydrochlorination of 3:4-dichlorbutene-1.

The production of chloroprene by heating 3:4-dichlorbutene-1 with an aqueous solution of an alkali is well known. Hitherto, difficulty has been experienced in operating the process, particularly in a continuous manner, owing to the formation of polymeric and resinous material, which rapidly blocks up the apparatus. This polymeric material, which has a rubbery texture, is particularly difficult to remove since it is insoluble in solvents, and its formation necessitates the frequent dismantling of the plant to remove it.

It is an object of the present invention to provide an improved process for the production of chloroprene, in which the formation of polymeric and resinous material is very greatly reduced.

According to the present invention, the process for the production of chloroprene by heating 3:4-dichlorbutene-1 with an aqueous solution of an alkali is characterised in that the reaction takes place in the presence of a mercaptide.

The presence of a mercaptide in the reaction mixture effectively inhibits the formation of polymeric material and as a result the operation of the process is greatly facilitated. The mercaptide may be added to the reaction mixture as such, or in the form of a substance which is converted to a mercaptide under the conditions of the reaction. Suitable mercaptides are, for instance, the salts of thiols such as propyl mercaptan, butyl mercaptan, amyl mercaptan, hexyl mercaptan, benzyl mercaptan, thiosalicylic acid, thioglycollic acid, trithiocarbonic acid or O-alkyldithiocarbonic acid. Alkali metal salts of the two last-named acids are formed by the addition of carbon disulphide to the reaction mixture. Substances which will be converted to mercaptides under the reaction conditions also include the thiols themselves which will be converted to alkali metal salts, i.e., mercaptides, by the alkali metal hydroxide present. Thio-urea is a further example of a substance which is converted to a mercaptide under the reaction conditions, and may be added to the reaction mixture as such, or in the form of a complex with an alkyl halide, for instance 3:4-dichlorbutene-1. Where the thio-urea is added as such it is believed to form a complex with the dichlorbutene present, which complex breaks down under the influence of alkali to give a mercaptide.

Formation of the undesirable polymeric material is effectively inhibited by the presence of very small quantities of the aforementioned mercaptides. We have found that concentrations of as little as about 0.1 to 5.0% by weight mercaptide based on the volume of the reaction medium are suitable, with no apparent advantage at this time to be gained by employing more than about 1%.

The reaction is preferably carried out by introducing the 3:4-dichlorbutene-1 into a solution of the alkali such as a 5 to 20% aqueous sodium hydroxide solution containing the mercaptide or a substance which will be converted into a mercaptide, preferably with stirring or agitation. The solution is maintained above the boiling point of chloroprene, i.e., about 60° C., which is distilled off as it is formed. Instead of sodium hydroxide, other alkali metal hydroxides such as potassium hydroxide may be used as dehydrochlorinating agents, or alkaline earth metal hydroxides such as calcium or barium hydroxide.

The following examples are given further to illustrate the process of the invention. In the present application it is to be understood that parts by weight and parts by volume bear the same relation to each other as do kilograms of water to litres of water. Accordingly it is possible to specify percent by weight of inhibitor based on the volume of the reaction mixture.

EXAMPLE 1

100 parts by volume of 10% sodium hydroxide solution together with 0.194 part by weight of thiourea were placed in a reaction vessel fitted with nitrogen inlet and reflux condenser, the outlet of the condenser being fitted with a water trap to prevent the entrance of air. 25 parts by volume of 3:4-dichlorbutene-1 were added down the condenser under a blanket of nitrogen. The mixture in the flask was then heated under gentle reflux for three hours to convert the dichlorbutene to chloroprene. The reaction mixture was then allowed to cool to room temperature and was filtered.

The residual material on the filter paper, after washing with water and light petroleum (40–60° C.) and drying, amounted to 0.07 part by weight of chloroprene polymer.

The process was repeated using other polymerisation inhibitors according to the present invention, as well as conventional inhibitors, and in each case the weight of polymer remaining on the filter paper was taken as a measure of the efficiency of the inhibitors. The results are shown in Table 1.

Table 1

| Inhibitor | Amount of inhibitor added, parts by weight | Polymer formed, parts by weight |
|---|---|---|
| Thiourea | 0.194 | 0.07 |
| Thiourea/3:4-dichlorbutene-1 complex (M.P. 266° D.) | 0.3 | 0.016 |
| Thiosalicylic acid | 0.251 | 0.102 |
| Thioglycollic acid | 0.253 | negligible |
| Benzyl mercaptan | 0.254 | negligible |
| n-Butyl mercaptan | 0.257 | 0.012 |
| 2-Mercaptobenzthiazole | 0.247 | 0.10 |
| t-Butyl catechol | 0.253 | 1.232 |
| Thiodiphenylamine | 0.266 | 0.98 |
| Anthracene | 0.025 | (1) |
| Pyrogallol | 0.252 | 0.58 |

[1] Practically complete polymerisation.

EXAMPLE 2

500 parts by weight of 10% sodium hydroxide solution were placed, together with mercaptide-forming inhibitors in a reaction vessel, and nitrogen was passed through the agitated mixture for one hour to remove oxygen. The temperature of the mixture was then raised to 83–86° C. and 125 parts by weight of 3:4-dichlorobutene-1 was added over approximately 30 minutes, while chloroprene was distilled out of the reaction vessel. The temperature was finally raised to 103° to complete the removal of volatile organic matter after which the vessel contents were cooled and filtered to determine the degree of polymer formation.

The weights of residual polymer and the effective reduction in polymer formation using different concentrations of thiourea inhibitor as well as results with other inhibitors within the scope of the present invention are shown in Table 2.

*Table 2*

| Inhibitor | parts by weight of inhibitor added | parts by weight of polymer formed | Percent reduction in polymer formation |
|---|---|---|---|
| None | | 1.015 | |
| Thiourea | 1.25 | 0.106 | 89.5 |
| Thiourea | 0.5 | 0.233 | 77.0 |
| 3:4-di-(isothiouroneum)-butene-1 dihydrochloride | 1.5 | 0.462 | 54.5 |
| Potassium ethyl xanthate | 2.5 | 0.127 | 87.5 |
| Carbon disulphide [1] | 1.25 | 0.125 | 87.7 |

[1] The carbon disulphide was dissolved in the sodium hydroxide 24 hours prior to carrying out the process.

I claim:

1. A process for the production of chloroprene which comprises heating 3:4-dichlorobutene-1 with an aqueous solution of an alkali in the presence of a mercaptide selected from the group consisting of alkali metal and alkaline earth metal mercaptides.

2. A process as set in claim 1 wherein the concentration of mercaptide is between about 0.1 and 5% by weight based on the volume of the reaction mixture.

3. A process as set in claim 1 wherein the concentration of mercaptide is between about 0.1 and 1% by weight based on the volume of the reaction mixture.

4. A process as set forth in claim 1 wherein the mercaptide is selected from the group consisting of alkali metal and alkaline earth metal salts of propyl mercaptan, butyl mercaptan, amyl mercaptan, hexyl mercaptan, benzyl mercaptan, thiosalicylic acid, thioglycollic acid, trithiocarbonic acid and O-alkyldithiocarbonic acid.

5. A process as set forth in claim 1 wherein the mercaptide is formed in the reaction mixture by the addition of thiourea thereto.

6. A process as set forth in claim 1 wherein mercaptide is formed in the reaction mixture by the addition of carbon disulphide thereto.

References Cited in the file of this patent

UNITED STATES PATENTS

| 1,950,438 | Carothers et al. | Mar. 13, 1934 |
| 2,136,334 | Coleman et al. | Nov. 8, 1938 |
| 2,407,396 | Brubaker | Sept. 10, 1946 |
| 2,407,405 | Dietrich | Sept. 10, 1946 |
| 2,430,016 | Hearne et al. | Nov. 4, 1947 |